(12) United States Patent
Kitabayashi

(10) Patent No.: US 8,279,899 B2
(45) Date of Patent: Oct. 2, 2012

(54) FIBER LASER

(75) Inventor: Tomoharu Kitabayashi, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 12/621,318

(22) Filed: Nov. 18, 2009

(65) Prior Publication Data

US 2010/0061409 A1    Mar. 11, 2010

Related U.S. Application Data

(63) Continuation of application No. PCT/JP2008/058842, filed on May 14, 2008.

(30) Foreign Application Priority Data

May 18, 2007 (JP) ................................. 2007-132755

(51) Int. Cl.
*H01S 3/30* (2006.01)
(52) U.S. Cl. ...... 372/6; 372/50.11; 372/99; 359/337.21; 359/341.1
(58) Field of Classification Search ........... 372/6, 50.11, 372/99; 359/337.21, 341.1
See application file for complete search history.

(56) References Cited

U.S. PATENT DOCUMENTS

| | | |
|---|---|---|
| 5,309,455 A | 5/1994 | Adachi et al. |
| 5,659,644 A | 8/1997 | DiGiovanni et al. |
| 5,864,644 A | 1/1999 | DiGiovanni et al. |
| 6,658,189 B2 * | 12/2003 | Ajima et al. ................... 385/123 |
| 7,539,231 B1 * | 5/2009 | Honea et al. .................... 372/69 |
| 2002/0003655 A1 | 1/2002 | Park et al. |
| 2004/0213302 A1 * | 10/2004 | Fermann et al. ................. 372/6 |
| 2005/0207455 A1 * | 9/2005 | MacCormack et al. .......... 372/6 |

FOREIGN PATENT DOCUMENTS

| | | |
|---|---|---|
| JP | 05-136498 A | 6/1993 |
| JP | 2653936 B2 | 9/1997 |
| JP | 10-056227 A | 2/1998 |
| JP | 2977053 B2 | 11/1999 |
| JP | 2002-252399 A | 9/2002 |
| JP | 2005-251999 A | 9/2005 |
| JP | 2007-42981 A | 2/2007 |
| JP | 2007-114335 A | 5/2007 |
| WO | 01/63818 A1 | 8/2001 |
| WO | 2005/074573 A2 | 8/2005 |

OTHER PUBLICATIONS

Chinese Office Action dated Aug. 4, 2010, issued in corresponding Chinese Patent Application No. 200880016500.7.

(Continued)

*Primary Examiner* — Yuanda Zhang
(74) *Attorney, Agent, or Firm* — Westerman, Hattori, Daniels & Adrian, LLP

(57) ABSTRACT

A fiber laser of an MOPA type includes an MO which is a laser oscillator for generating seed light, a PA which is a light amplifier connected to a rear stage of the MO, for amplifying and outputting laser light emitted from the MO, and a reflection device which is provided between the MO and the PA. According to the present invention, the MOPA type fiber laser can decrease the peak value of the pulse which is emitted toward the MO or the pump light source by self-oscillation or reflection, and makes it unlikely that the pump light source or the MO will be damaged.

8 Claims, 5 Drawing Sheets

OTHER PUBLICATIONS

International Search Report of PCT/JP2008/058842, mailing date of Jun. 17, 2008.
Supplementary European Search Report dated Jan. 12, 2011, issued in corresponding European Patent Application No. 08752713.1.
Karasek, M.; "Analysis of Gain Improvement of PR3+-Doped Fluoride Fibre Amplifiers using an optical Filter or Isolator"; Optics Communications, North-Holland Publishing Co., Amsterdam, NL, vol. 107, No. 3/04, Apr. 15, 1994, pp. 235-239, XP000434987.
Nakai, Michihiro et al.; "30W Q-SW fiber laser" Fiber Lasers IV; Technology, Systems, and Applications Jan 22, 2007, San Jose, CA, USA, vol. 6453, Feb. 22, 2007, pp. 654319-1-654319-9, XP002614418.

\* cited by examiner

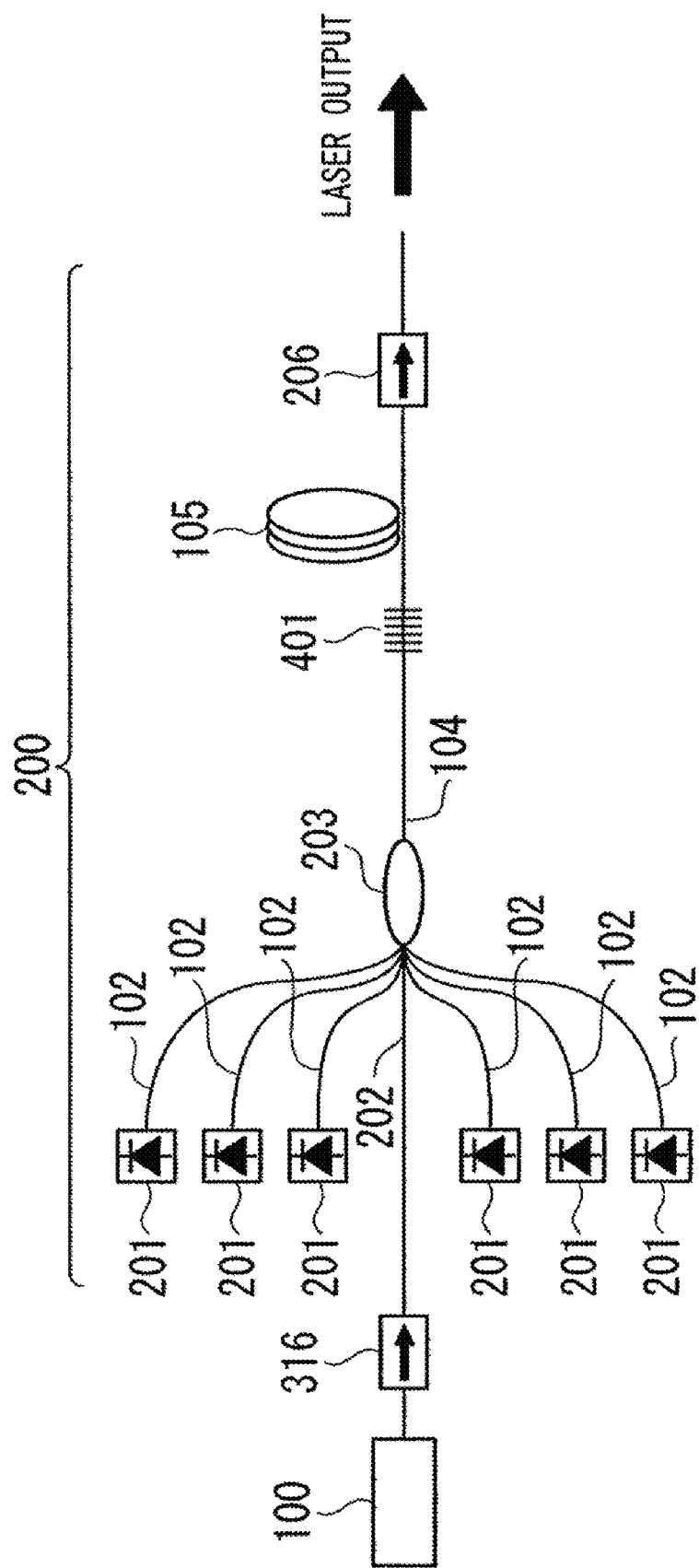

FIBER LASER

TECHNICAL FIELD

This application is a continuation application based on a PCT Patent Application No. PCT/JP2008/058842, filed May 14, 2008, whose priority is claimed on Japanese Patent Application No. 2007-132755 filed May 18, 2007, the entire content of which are hereby incorporated by reference.

BACKGROUND ART

In recent years, the output power of fiber lasers continues to increase, and fiber lasers with high output power of more than a kW-order have been developed. Such high power fiber lasers are used in various industrial applications such as processing machines, medical apparatuses, and measuring instruments. The use of fiber lasers have been rapidly widened because in the material-processing field, fiber lasers are superior to other lasers in their light focusing properties and can significantly increase the power density at focusing points, so as to enable precision machining, and because it enables performing a noncontact processing, and also enables processing of hard materials which can absorb laser light.

FIG. 1 shows a schematic view of a typical high power fiber laser which is called a master oscillator—power amplifier (MOPA) type. The MOPA type fiber laser is configured to connect the rear stage of the MO with the PA, and obtains the high power laser light by amplifying the weak pulse light output from the MO using the PA. When sufficient power cannot be obtained by a PA of one stage, PAs are connected in a multistage manner to obtain the desired power.

For the Mo, there is a type in which the density of the output power of the laser light source which performs CW oscillation such as a semiconductor laser, is intensity-modulated using a modulator such as an acousto-optic element in order to obtain pulse light. There is also a type for the MO, which employs a fiber ring laser, as shown in Patent Document 1, for example. FIG. 2 is a view illustrating a structure of a typical optical fiber ring laser.

The known fiber ring laser 310 shown in FIG. 2 is composed of a pump light source 311, a WDM coupler 312 which combines pump light and laser light, a rare earth-doped optical fiber 313 which is a gain medium, an isolator 314, a light switch element 317, and an output coupler 315. The pump light emitted from the pump light source 311 is coupled to the rare earth-doped optical fiber 313 via the WDM coupler 312. The pump light coupled to the rare earth-doped optical fiber 313 is absorbed into rare earth ions which are doped to the core of the rare earth-doped optical fiber 313, and the rare earth ions are in the excited state. The rare earth ions in the excited state emit spontaneous emission light of a specific wavelength. The spontaneous emittion light is amplified and propagated in the rare earth-doped optical fiber, and are output as an amplified spontaneous emission (ASE). Alternatively, the WDM coupler 312, the rare earth-doped optical fiber 313, the isolator 314, the output coupler 315 and the light switch element 317 are connected in a ring shape. The ASE passes through these portions and circulates, and is amplified again by the rare earth-doped optical fiber 313 until laser oscillation is achieved, and then part of this light is output as laser light via the output coupler 315. In addition, when the light switch element 317 is operated in a normal low loss state, CW oscillation is obtained and thus the laser light is outputted as a continuous light. Alternatively, when the light switch element 317 is operated to repeat periodically the low loss state and the high loss state, pulse oscillation is obtained and thus laser output in pulse form is obtained.

Alternatively, as the PA, an amplifier having the structure shown in FIG. 3 is generally used. FIG. 3 shows an exemplary structure of the MOPA type fiber laser. The reference numeral 100 shown in FIG. 3 corresponds to the MO, the reference numeral 200 corresponds to the PA, and laser light output from the MO 100 is amplified by the PA 200 via the interstage isolator 316 and output.

The PA 200 is composed of a plurality of pump light sources 201, a photocoupler 203, a rare earth-doped double-clad fiber 105, and an isolator 206. The pump light source 201, the photocoupler 203, the rare earth-doped double-clad fiber 105, and the isolator 206 may be the same as those used in the fiber laser 100. For example, as the photocoupler 203, the photocoupler which is disclosed in Patent Document 2 is employed. The photocoupler 203 includes a plurality of pumping ports 102 each configured from multi-mode optical fiber, and a signal port 202 composed of a single mode fiber, and further includes an emission port 104 which is integrally formed by fusing and extending the ports described above. The laser light emitted from the MO 100 is coupled to the signal port 202, and coupled to the core of the rare earth-doped double-clad fiber 105 via the photocoupler 203.

Alternatively, the pump light source 201 is connected to the pumping port 102. The pump light is coupled to a first clad of the rare earth-doped double-clad fiber 105 via the photocoupler 203. The pump light coupled to the first clad of the rare earth-doped double-clad fiber 105 is absorbed into rare earth ions which are doped in the core, and then, the population inversion and the induced emission is generated. Therefore, the laser light propagating in the core is amplified and output via the isolator 206.

In the case of the MOPA type shown in FIG. 3, while the signal light from the MO is not entered when the rare earth-doped double-clad fiber of the PA is pumped to reach a predetermined population inversion factor, self-oscillation or a phenomenon called parasitic oscillation is generated so that there may generate pulses with significantly high peak power. The population inversion factor generating self-oscillation or parasitic oscillation is determined by the reflectance of the incident side and the emission side of the rare earth-doped double-clad fiber. In some cases, the pulses caused by self-oscillation are emitted from the rare earth-doped optical fiber to the photocoupler. The pulses reach the pump light source or the MO, so that there may be a risk of damage thereon. In addition, even when the pulses emitted from the MO is entered in a cycle in which the PA does not oscillate by itself and the fiber laser is in a normal operating state, the reflected light from the outside of the PA output may induce oscillation while the pulses are being input. In general, the pump light source of the PA emits the pump light even between the oscillation of pulses, and the rare earth-doped double-clad fiber is in the pumping state. Therefore, the ASE light is emitted from both ends of the rare earth-doped double-clad fiber, and the reflected light may be coupled again to the fiber laser according to the surface state of an object. As a result, the reflected light acts as a source of the generation of oscillation, the pulses with significantly high peak power generated by self-oscillation are emitted from the rare earth-doped optical fiber to the photocoupler. These pulses reach the pump light source or the MO, so that there may be a risk of damage thereon.

In order to solve the problems, some solutions have been proposed.

As a first solution, the method as disclosed in Patent Document 3 is exemplified. According to the method, by inserting isolators on both ends of the rare earth-doped optical fiber, the reflectance is suppressed so as to be lower, so that self-oscillation is suppressed. Further, by providing a short wavelength pass filter at the emission side of the pump light source, repeated coupled to the rare earth-doped double-clad fiber of the ASE which has been emitted from the rare earth-doped double-clad fiber and is reflected by the pump laser, is suppressed. That is, the reflectance on the incident side and the emission side of the rare earth-doped fiber is suppressed as much as possible, so that self-oscillation is suppressed.

As a second solution, the method as disclosed in Patent Document 4 is an exemplary example. According to the method, the optical fiber amplifier is divided into two stages, and the isolator is provided between the stages. The gain of the front stage is suppressed so as to be lower, so that self-oscillation is suppressed. Even if the gain of the rear stage is high, since the ASE light is always coupled thereto, the ASE light is amplified but not to a sufficient level to cause self-oscillation.

As a third solution, the method as disclosed in Patent Document 5 is an exemplary example. In this method, the fiber laser having a structure such that the resonator is configured by providing fiber bragg gratings (FBG) at both ends of the rare earth-doped double-clad fiber, one of the FBG is connected to the multi-mode fiber, and the pump light from the pump light source is coupled to the rare earth-doped fiber via the multi-mode fiber. According to such a structure, since the diameter of the core of the multi-mode fiber is larger than that of the core of the rare earth-doped double-clad fiber, there is no reflection on the FBG, but unnecessary wavelength ASE which is coupled to the multi-mode fiber is reflected, so that the recombination ratio of the rare earth-doped optical fiber to the core is reduced. Therefore, self-oscillation can be suppressed. In addition, if self-oscillation occurs in some cases, since the generated pulses are firstly coupled to the multi-mode fiber, the above damage is suppressed because the spot diameter becomes larger even though the pump light is focused on the pump light source via the lens.

[Patent Document 1] Japanese Granted Patent, Publication No. 2977053
[Patent Document 2] Specification of U.S. Pat. No. 5,864,644
[Patent Document 3] Japanese Unexamined Patent Application, First Publication No. H05-136498
[Patent Document 4] Japanese Granted Patent, Publication No. 2653936
[Patent Document 5] Japanese Unexamined Patent Application, First Publication No. H10-56227

DISCLOSURE OF THE INVENTION

Problem that the Invention is to Solve

However, the first to third solutions in the related art described above have the following problems.

In the first solution, the suppression of reflectance is actually limited to about 0.001%. In relatively high-power fiber lasers outputting several tens of W or more, even when the reflection is suppressed, self-oscillation may be generated due to a small amount of reflection. In addition, after the laser is emitted, the intensity of the reflection from the outside is decreased by the isolator, but it cannot completely prevent the reflection. Therefore, the residual reflected light may act as seed light which induces oscillation.

In the second solution, since a high gain amplifier is provided at the emission side, the reflected light from the outside is firstly coupled to the high gain amplifier, so that it may induce oscillation. It may be conceivable that low gain amplifiers are employed in a multi-stage manner without using the high gain amplifier. However, in this case, the number of stages of amplifiers increases as the output power increases, so that the structure is complicated and the efficiency is also degraded.

In the third solution, when intensive pumping is performed in order to obtain the high output power, light with unnecessary wavelengths may be oscillated regardless of the reflection wavelength of the grating. Further, even though the diameter of the spot of the light focused on the pump light source is large, when the peak power of the pulses becomes large, there may be risk of the above damage. In addition, in regard to the reflected light which is reflected from the outside, light with the same wavelength as the reflection wavelength of the FBG is reflected by the FBG but light with other wavelengths passes through the FBG and is coupled to the rare earth-doped double-clad fiber, so that oscillation may be induced.

The present invention is made in view of the above circumstance, and an object is to provide an MOPA type fiber laser which can decrease peak values of the pulse, which are emitted toward the MO or the pump light source by self-oscillation or reflection, and make it unlikely that the pump light source or the MO will be damaged.

Means for solving the Problem

In order to achieve the object, the present invention provides a fiber laser of an MOPA type which includes: an MO which is a laser oscillator for generating seed light; a PA, which is a light amplifier connected to a rear stage of the MO, for amplifying and outputting laser light emitted from the MO; and a reflection device which is provided between the MO and the PA.

In addition, the present invention provides a fiber laser of an MOPA type which includes: an MO which is a laser oscillator for generating seed light; and a PA, which is a light amplifier connected to a rear stage of the MO, for amplifying and outputting laser light emitted from the MO. The PA is composed of a photocoupler, which includes a pumping port in which a pump light from a pump light source is coupled, a signal port in which the laser light from the MO is coupled, and an emission port through which the pump light from the pumping port and a signal light from the signal port are combined and emitted; a pump light source which is connected to the pumping port; and a rare earth-doped optical fiber which is connected to the emission port. A reflection device is provided at an output port of the photocoupler.

In the fiber laser according to the present invention, it is preferable that the reflection wavelength of the reflection device be in a gain wavelength band of a rare earth-doped optical fiber which is used in the PA.

In the fiber laser according to the present invention, it is preferable that the reflection wavelength of the reflection device be different from the oscillation wavelength of the MO.

In the fiber laser according to the present invention, it is preferable that the gain of the rare earth-doped optical fiber of the PA in the reflection wavelength of the reflection device is greater than the gain of the rare earth-doped optical fiber of the PA in the oscillation wavelength of the MO.

In the fiber laser according to the present invention, it is preferable that the reflection device be a dielectric multilayer mirror.

In the fiber laser according to the present invention, it is preferable that the reflection device is a fiber bragg grating.

In the fiber laser according to the present invention, it is preferable that the reflectance of the reflection device be greater than the reflectance of the emission side as viewed from the output port of the rare earth-doped optical fiber of the PA.

In the fiber laser according to the present invention, it is preferable that the reflection device be a dielectric multilayer mirror.

In the fiber laser according to the present invention, it is preferable that the reflection device be a fiber bragg grating.

Advantage of the Invention

The fiber laser according to the present invention is provided with a reflection device with a small reflectance. With such a structure, the peak power of the pulse, which is emitted toward a master oscillator (MO) or to the pump light source by self-oscillation or reflection, can be suppressed so as to be taken it down about two places or more.

In addition, by using a reflection device with a wavelength different from an oscillation wavelength, it is possible to prevent efficiency degradation without causing loss in signal light.

In addition, since the peak power of the pulse emitted toward the MO or the pump light source by self-oscillation or reflection can be decreased, there is no damage on the pump light source or the MO, and a laser with high reliability can be provided. That is, it is possible to improve the reliability of fiber lasers.

In addition, depending on the output of the fiber laser, the fiber laser can be manufactured at a low cost since there is no self-oscillation even though there is no PA isolator which has a very high price.

BRIEF DESCRIPTION OF THE DRAWINGS

FIG. 8 is a view illustrating a structure of a fiber laser according to a second embodiment of the present invention.

DESCRIPTION OF REFERENCE NUMERALS AND SIGNS

Figure 1:
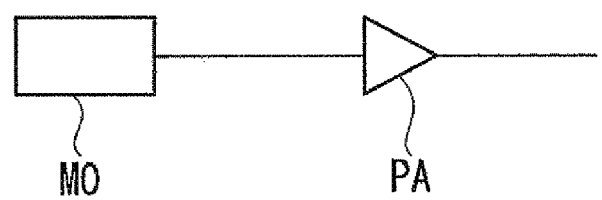
FIG. 1 is a view illustrating an exemplary basic structure of an MOPA type fiber laser.

100: MO
102: pumping port
104: emission port
105: rare earth-doped double-clad fiber (rare earth-doped optical fiber)
201: pump light source
202: signal port
203: photocoupler
206: isolator (PA isolator)
316: interstage isolator
401: reflection device

BEST MODE FOR CARRYING OUT THE INVENTION

Hereinafter, a fiber laser according to embodiments of the present invention will be described with reference to the accompanying drawings.

Figure 2:
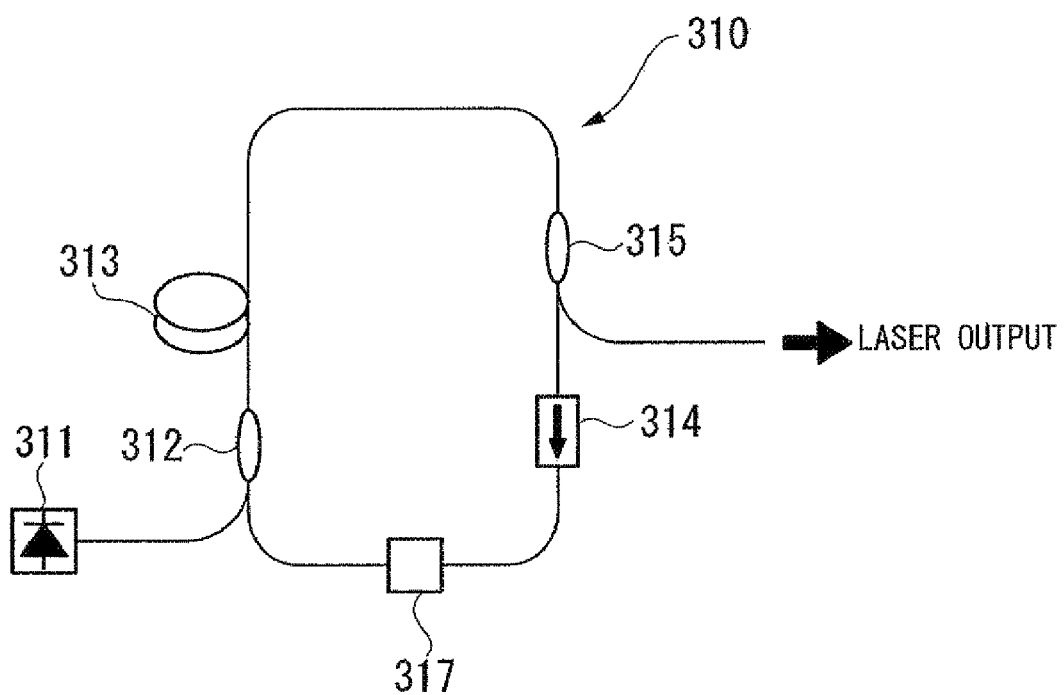
FIG. 2 is a view illustrating an exemplary structure of a fiber ring laser used in the MO.
Figure 3:
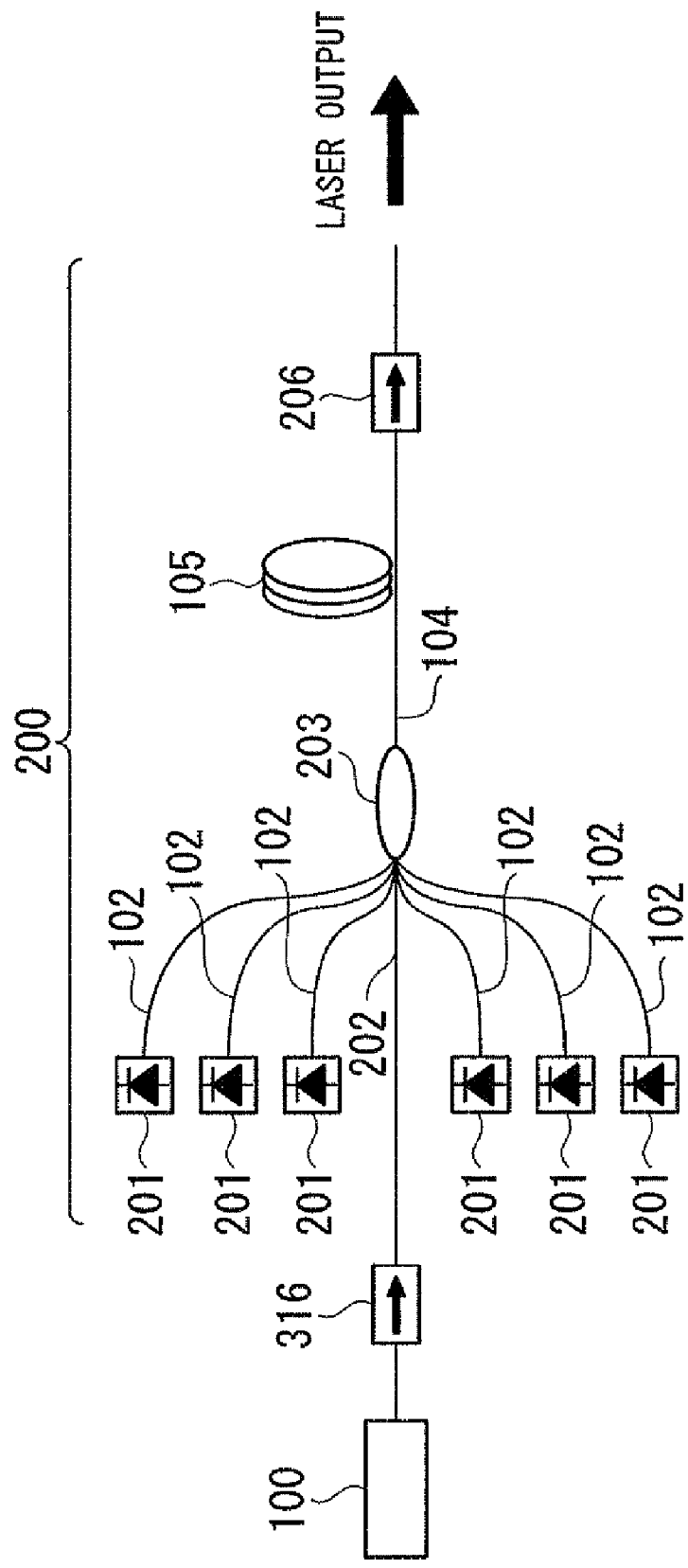
FIG. 3 is a view illustrating an exemplary structure of the known MOPA type fiber laser.
Figure 4:
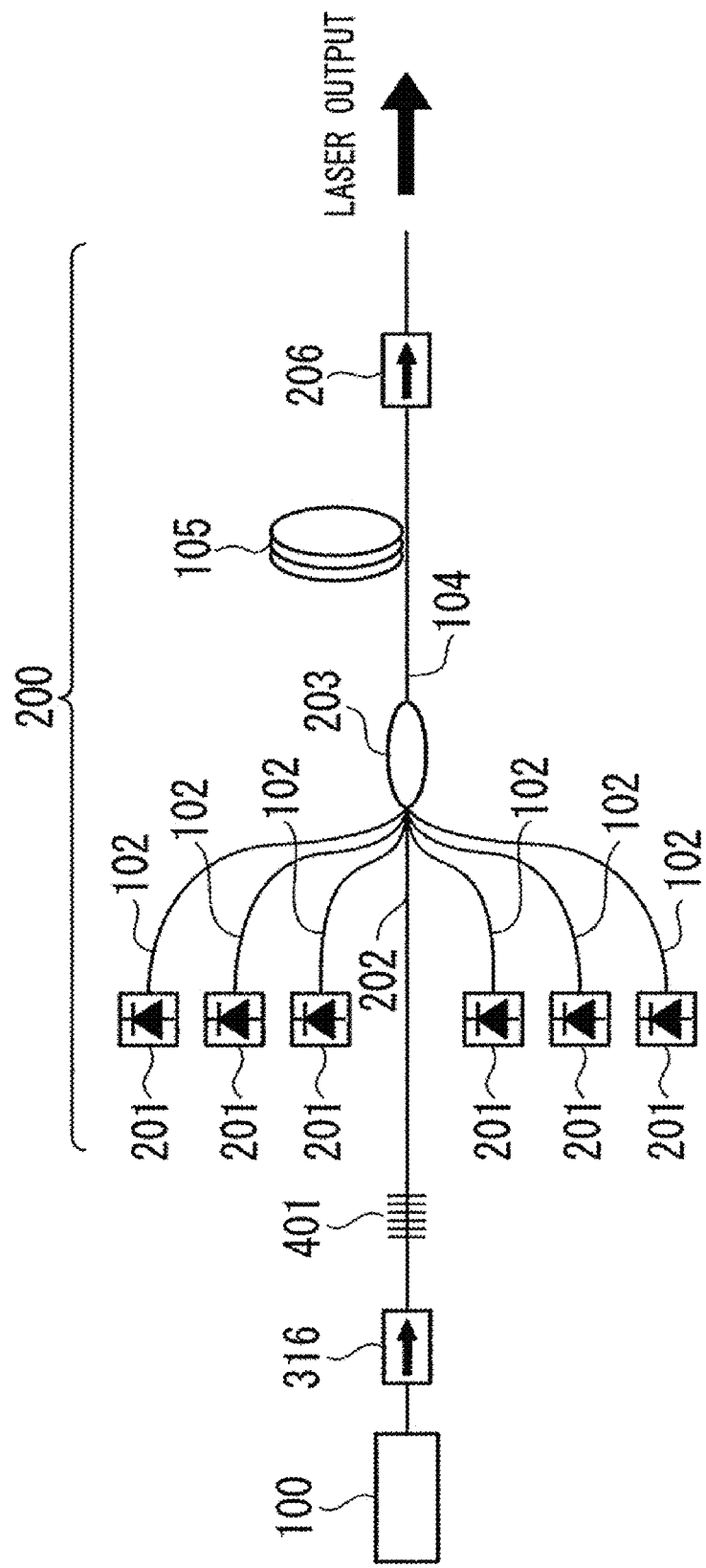
FIG. 4 is a view illustrating a structure of a fiber laser according to a first embodiment of the present invention.

FIG. 4 is a view illustrating a structure of the fiber laser according to a first embodiment of the present invention. The fiber laser of the embodiment is the same as the fiber laser shown in FIG. 3, and is an MOPA type fiber laser which is configured to connect an MO 100 with a PA 200. As the MO 100, a fiber ring laser 310 shown in FIG. 2 can be used, for example. The output side of the MO 100 is connected to the PA 200 via an interstage isolator 316 and a reflection device 401 which is provided at the rear stage of the interstage isolator 316. The laser light output from the MO 100 is amplified by the PA 200 via the interstage isolator 316 and the reflection device 401, and is output.

The PA 200 is composed of a plurality of pump light sources 201, a photocoupler 203, a rare earth-doped double-clad fiber 105, and an isolator 206. The pump light source 201, the photocoupler 203, the rare earth-doped double-clad fiber 105, and the isolator 206 may be the same as those used in the fiber laser 100. For example, as the photocoupler 203, the photocoupler which is disclosed in Patent Document 2 is employed. The photocoupler 203 includes a plurality of pumping ports 102 each composed of a multi-mode optical fiber, and a signal port 202 composed of a single mode fiber, and further includes an emission port 104 which is formed by integrally fusing and extending the ports described above. The laser light emitted from the MO 100 is coupled to the signal port 202, and is coupled to the core of the rare earth-doped double-clad fiber 105 via the photocoupler 203. Alternatively, the pump light source 201 is connected to the pumping port 102. The pump light is coupled to a first clad of the rare earth-doped double-clad fiber 105 via the photocoupler 203. The pump light coupled to the first clad of the rare earth-doped double-clad fiber 105 is absorbed into rare earth ions which are doped in the core, and then the population inversion is formed and the stimulated emission is generated. Therefore, the laser light propagating in the core is amplified and output via the isolator 206.

As described above, in the known MOPA type fiber laser shown in FIG. 3, while signal light emitted from the MO 100 is entered when the rare earth-doped double-clad fiber 105 of the PA 200 is pumped so as to reach a predetermined population inversion factor, self-oscillation (parasitic oscillation) is generated so that a pulse with a significantly high peak power may occur. When the pulse reaches the pump light source 201 or the MO 100, there may be risk of damage thereto. In addition, even when the pulses emitted from the MO 100 are coupled to the PA 200 in a cycle without generating the self-oscillation and the fiber laser is in a normal operating state, the light reflected from a surface of an object may be coupled again to the fiber laser. The reflected light acts as a source for the generation of oscillation, the pulses with significantly high peak power are emitted from the rare earth-doped double-clad fiber 105 to the photocoupler 203. These pulses reach the pump light source 201 or the MO 100, so that there may be risk of damage thereto.

In order to solve the problems, the fiber laser according to the embodiment is provided with the reflection device 401 between the MO 100 and the PA 200. The reflection device 401 is manufactured to reflect only a part of the fluorescence wavelengths of the rare earth-doped double-clad fiber 105. With this structure, even if the signal from the MO 100 is not entered but the rare earth-doped double-clad fiber 105 of the PA 200 is pumped, the fiber laser can be forcibly oscillated at the reflection wavelength of the reflection device 401 when population inversion factor reaches a certain level (when a certain time period has lapsed).

The population inversion factor (the time until oscillation starts) in which oscillation occurs is changed by the reflectance of the reflection device. As the reflectance is higher, oscillation occurs at a lower population inversion factor (oscillation occurs early). When oscillation is made to occur early, the peak power of the pulse generated by oscillation can be suppressed so as to be lower. In addition, when the reflectance at the emission side as viewed from the output port of the PA 200 is smaller than that of the reflection device 401, most power of pulses generated by the oscillation are emitted from the PA 200 to the emission side, and only a little power of pulses are emitted to the MO 100. Therefore, there is no damage on the pump light source or the MO 100.

As the reflection device 401, it is preferably that a dielectric multilayer film minor or a fiber bragg grating (hereinafter, referred to as FBG) is used. The reflectance of the reflection device 401 is preferably greater than the reflectance at the emission side as viewed from the output port of the rare earth-doped double-clad fiber 105 of the PA 200, and more particularly, equal to or greater than 0.001%.

The fiber laser according to the embodiment is provided with the reflection device 401 with a small reflectance. With such a structure, the peak power of the pulse, which is emitted toward the MO 100 or the pump light source 201 by self-oscillation or reflection, can be suppressed so as to be lower by two places or more.

In addition, by using the reflection device 401 with a wavelength different from the oscillation wavelength, it is possible to remove loss in signal light and efficiency degradation.

In addition, since the peak power of the pulse emitted toward the MO 100 or the pump light source 201 can be decreased, there is no damage on the pump light source 201 or the MO 100, and fiber laser with high reliability can be provided.

In addition, depending on the output of the fiber laser, the fiber laser can be manufactured at a low cost since there is no self-oscillation even though there is no PA isolator 206 which has a very high price.

FIG. 8 is a view illustrating a structure of the fiber laser according to a second embodiment of the present invention. The fiber laser of this embodiment is composed of the same components as those of the fiber laser according to the first embodiment shown in FIG. 4, and the same constitute components are designated by like reference numerals.

The fiber laser according to this embodiment is provided with the reflection device 401, which is provided between the MO 100 and the PA 200 in the first embodiment, between the photocoupler 203 in the PA 200 and the rare earth-doped double-clad fiber 105 (that is, at the output port of the photocoupler 203).

Similar to the fiber laser according to the first embodiment shown in FIG. 4, also in the fiber laser according to this embodiment, the peak power of the pulse, which is emitted toward the MO 100 or the pump light source 201 by self-oscillation or reflection, can be suppressed so as to be lower. There is no damage on the pump light source 201 or the MO 100. A fiber laser with high reliability can be provided. Therefore, the same effect as those of the first embodiment can be obtained.

Hereinafter, the effect of the present invention will be proved using embodiments.

EXAMPLE

The known MOPA type fiber laser shown in FIG. 3 (hereinafter, referred to as a comparative example) and the fiber laser shown in FIG. 4 as the embodiment of the present invention were produced by way of experimentation.

In both the comparative example and the embodiment, a fiber ring laser with an oscillation wavelength of 1064 nm is used as the MO 100.

As the rare earth-doped double-clad fiber 105, an Yb-doped double-clad fiber is used, of which the diameter of the core is 20 μm, the diameter of a first clad is 400 μm, and the absorption of the core is 1200 dB/m @976 nm.

As the photocoupler 203, a coupler which has an emission port of which the diameter of the core is 20 μm, and the diameter of the clad is 390 μm is used, in order to reduce the connection loss of the pump light between the photocoupler 203 and the rare earth-doped double-clad fiber 105. Pumping ports are connected to the pump light source. The incident port is composed of six pumping ports 102 each composed of a multi-mode fiber, of which a diameter of the core is 105 μm and NA is 0.15, and one signal port 202 composed of a single mode fiber of which a diameter of the core is 6 μm and NA is 0.14.

As the pump light source 201, six semiconductor lasers are used, and each of which has an oscillation wavelength of 915 nm and a maximum output of 5 W.

In the fiber laser according to the embodiment, FBG is provided as the reflection device 401 (the fiber laser is not provided in the comparative example). The reflection wavelength of the FBG may be any wavelength as long as it is in the fluorescence wavelength of the rare earth-doped double-clad fiber 105. The wavelength with a high gain is preferable because oscillation occurs early when the wavelength has a gain which is as high as possible. In addition, as the reflection device, a filter composed of a dielectric multilayer can also be employed. However, as there is concern that the device may be burnt out at high output, the FBG is preferable. In this embodiment, the reflection wavelength is selected to be 1040 nm. In addition, when the wavelength is set to the same wavelength as the oscillation wavelength of the MO 100, laser light emitted from the MO 100 and coupled to the PA 200 is reflected. Therefore, when the reflectance of the FBG is high, the MO 100 may be damaged. In this case, it is preferable that countermeasures are used so that the isolation of the interstage isolator 316 increases.

Figure 5:
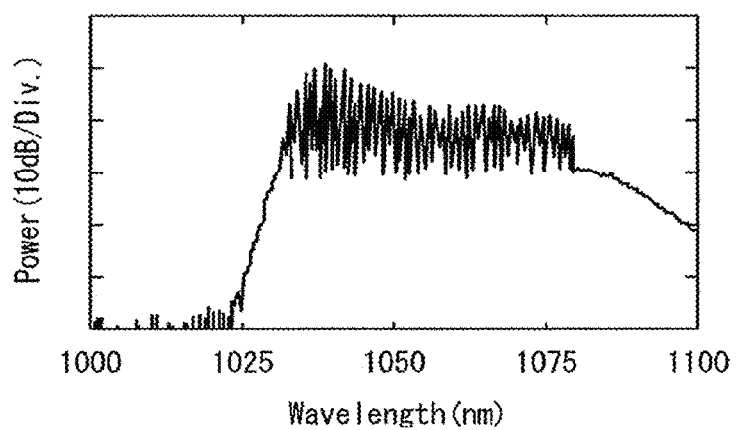
FIG. 5 is a graph illustrating an output wavelength spectrum during self-oscillation of a comparative example among the results of an embodiment.
Figure 6:
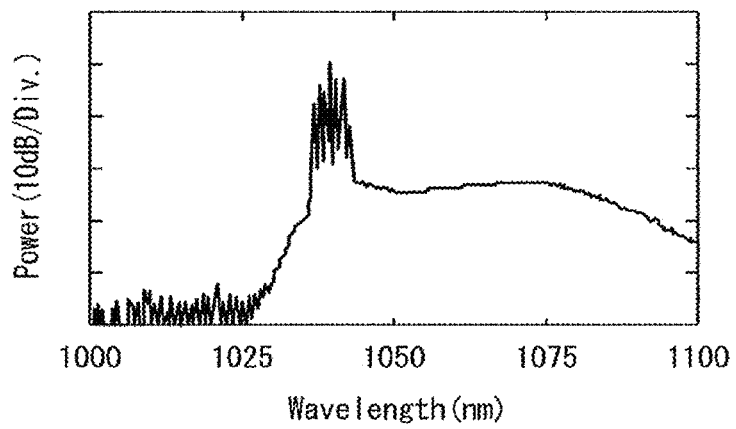
FIG. 6 is a graph illustrating an output wavelength spectrum during self-oscillation of an embodiment.

Using the fiber laser, self-oscillation is observed in a state where the signal from the MO 100 is not input to PA 200 and the pump light source 201 of the PA 200 is driven to pump the rare earth-doped double-clad fiber 105 with a pumping power of 30 W. FIGS. 5 and 6 respectively show the output wavelength spectrum during self-oscillation at the output port of the PA of the fiber laser of the comparative example and the fiber laser of the embodiment. At this time, the reflectance of the FBG is 0.1%. As shown in FIG. 5, the fiber laser of the comparative example oscillates at random in the wavelength band with a relatively high gain of about from 1030 nm to 1075 nm. Alternatively, as shown in FIG. 6, in the embodiment, it can be known that the oscillation wavelength is limited to the vicinity of 1040 nm by the insertion of the FBG. The wavelength band in which self-oscillation occurs when the FBG is inserted is determined by the reflection wavelength band of the FBG. Therefore, it is also possible to further limit the oscillation wavelength by using the FBG with a narrowband.

Figure 7:
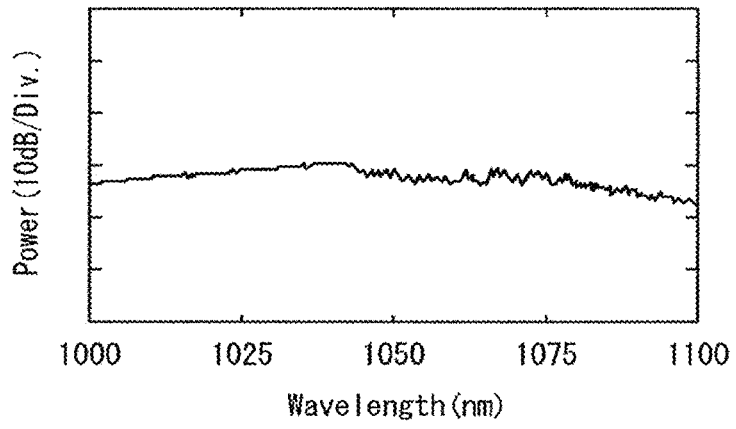
FIG. 7 is a graph illustrating a wavelength spectrum of light emitted from the PA to the MO according to an embodiment.

In addition, in the state where the FBG is provided, the wavelength spectrum of light emitted from the PA 200 to the MO 100 is observed at the connection portion between the FBG and the isolator, which is shown in FIG. 7. In FIG. 7, it can be known that the pulse component (1040 nm) from self-oscillation has the same intensity as that of an amplified spontaneous emission (ASE) light with a different wavelength. That is, by providing the FBG, it represents that most power of pulses generated by self-oscillation are emitted toward the output port of the rare earth-doped double-clad fiber 105. In addition, in the case of the fiber laser of the comparative example, the peak power of the pulse during self-oscillation is 9 W at the output port of the laser, 5 W at the output port of the interstage isolator, and 1 W at the pumping port. In the case of the fiber laser of the embodiment, the peak value of the pulse during self-oscillation is 17 W at the output port of the laser, 0.02 W at the output port of the interstage isolator, and 0.007 W at the pumping port. The peak value of the pulse emitted from the PA 200 to the MO 100 can be taken down about two places or more.

Further, the reflectance of the FBG in the embodiment is 0.1%, but when the reflectance increases, the peak power of the pulse emitted from the PA 200 to the MO 100 can be further decreased.

In addition, in the fiber laser of the comparative example, a metal plate is provided at a position to which the laser is emitted from the PA 200. When the reflected light that is reflected by the metal plate is coupled again to the output port of the PA 200, the peak power at the output port of the interstage isolator is 6 W. However, when the fiber laser of the embodiment is similarly coupled by the reflected light, the peak power at the output port of the interstage isolator is 0.3 W. Therefore, even when the reflected light is coupled again, the peak power of pulse emitted from the PA to the MO is weak.

In this case, the reflectance of the reflected light to be coupled again to the output port is changed according to the actual use condition, but it may be sufficient that the reflectance of the FBG becomes large. By enlarging the reflectance of the FBG, self-oscillation can be controlled. Taking into consideration the structure shown in FIG. 4, the reflectance at the emission side does not become equal to or less than the reflectance of the PA isolator. In general, the reflectance of the isolator subjected to a low reflection treatment is 0.001%. Therefore, it is preferable that the reflectance of the FBG be equal to or greater than 0.001%. In addition, in the case of the laser which emitting the pulse output, when the reflectance is set too high, the self-oscillation is started within a period of time shorter than the desired repetitive period, and as a result, the pulse cannot be efficiently generated. Therefore, there is no need for the reflectance to be set to be excessively high. In many cases in actual use, a lens is provided in front of the output port of the fiber laser to be collimated. In this case, the reflectance of the reflected light is coupled again to the PA due to the reflection from the outside is about 10% at the most. Therefore, it is preferable that the reflectance of the grating be in a range of about from 0.001% to 10%.

The gain of the reflection wavelength of the rare earth-doped double-clad fiber of the FBG is preferably equal to or more than the gain of the oscillation wavelength of the MO. This is because oscillation easily occurs in accordance with the amplitude of the gain.

In this embodiment, the oscillation wavelength of the MO is different from the reflection wavelength of the FBG, but if the two wavelengths are the same, the same effect can be obtained. In this case, since there is loss in the laser light from the MO 100, it is preferable that the wavelengths be different from each other. In addition, when the reflectance is extremely high, the reflected laser light is coupled again to the MO 100, so that the components in the MO 100 may be damaged. The reflectance is appropriately selected so as not to cause such a result, and preferably, the reflectance is 10% or less.

FIG. 8 is shows a second embodiment of the present invention. Specifically, the structure thereof is the same as that of the first embodiment described above, but is different from that shown in FIG. 4 in that the reflection device 401 is connected to the emission port 104 of the photocoupler 203, and the rare earth-doped double-clad fiber 105 is connected to the rear stage thereof. That is, the position of the reflection device 401 is different from that of the first embodiment.

In the first embodiment, the reflection device 401 is provided at the incident terminal of the photocoupler. Therefore, since the photocoupler is included in a resonator during self-oscillation, an oscillation light emitted from the rare earth-doped double-clad fiber 105 reaches the pump light source via the photocoupler 203. Therefore, a pulse with a relatively high peak power can be coupled to the pump light source 201. In the second embodiment, the reflection device 401 is disposed on the position shown in FIG. 8, and because of this, the power of the pulse coupled to the pump light source 201 can be further reduced. Under the same pumping condition as the first embodiment, the fiber laser is driven, so that the peak power of the pulse coupled to the pump light source 201 is 0.2 mW. As a result, compared with the first embodiment, the peak power can be taken down about one place.

INDUSTRIAL APPLICABILITY

According to the present invention, the fiber laser is provided with the reflection device with a small reflectance. With such a structure, the peak power of the pulse, which is emitted toward the MO or the pump light source by self-oscillation or reflection, can be suppressed so as to be taken it down about two places.

In addition, by using the reflection device with a wavelength different from the oscillation wavelength, it is possible to remove efficiency degradation without causing loss in signal light.

In addition, since the peak power of the pulse emitted toward the MO or the pump light source can be reduced, there is no damage on the pump light source or the MO, and a laser with high reliability can be provided. That is, it is possible to improve the reliability of the fiber laser.

In addition, depending on the output of the fiber laser, the fiber laser can be manufactured at a low cost since self-oscillation can be eliminated without a PA isolator which is a very expensive element.

The invention claimed is:
1. A fiber laser of an MOPA type comprising:
an MO which is a laser oscillator for generating seed light; and
a PA which is a light amplifier connected to a rear stage of the MO, for amplifying and outputting laser light emitted from the MO,
wherein the PA is composed from a photocoupler, which includes a pumping port in which pump light from a pump light source is coupled, a signal port in which laser light from the MO is coupled, and an emission port through which pump light from the pumping port and signal light from the signal port are combined and emit- ted; a pump light source which is connected to the pumping port; and a rare earth-doped optical fiber which is connected to the emission port, wherein a reflection device is provided between the MO and an output port of the PA, wherein a reflection wavelength of the reflection device is in a gain wavelength band of a rare earth-doped optical fiber which is used in the PA, wherein when a signal from the MO is not entered but the rare earth-doped optical fiber is pumped so that a population inversion factor reaches a certain level, an output wavelength band during self-oscillation is limited to a reflection wavelength band due to forced oscillation at the reflection wavelength of the reflection device, wherein the reflection device is provided at an output port of the photocoupler, wherein the reflection wavelength of the reflection device is different from the oscillation wavelength of the MO, and wherein the gain of the rare earth-doped optical fiber of the PA in the oscillation wavelength of the reflection device is greater than the gain of the rare earth-doped optical fiber of the PA in the oscillation wavelength of the MO.

2. The fiber laser according to claim 1, wherein the reflection device is a dielectric multilayer mirror.

3. The fiber laser according to claim 1, wherein the reflection device is a fiber bragg grating.

4. The fiber laser according to claim 1, wherein the reflectance of the reflection device is greater than the reflectance of an emission side as viewed from an output port of the rare earth-doped optical fiber of the PA.

5. The fiber laser according to claim 4, wherein the reflectance of the reflection device is 0.001% or more.

6. The fiber laser according to claim 5, wherein the reflection device is a dielectric multilayer mirror.

7. The fiber laser according to claim 5, wherein the reflection device is a fiber bragg grating.

8. The fiber laser according to claim 5, wherein the reflectance of the reflection device is 10% or less.

* * * * *